United States Patent [19]

Thomasen

[11] Patent Number: 5,583,324

[45] Date of Patent: Dec. 10, 1996

[54] VIBRATION DAMPING DEVICE

[75] Inventor: Leonard Thomasen, Cotati, Calif.

[73] Assignee: Tekna Sonic, Inc., Cotati, Calif.

[21] Appl. No.: 263,927

[22] Filed: Jun. 21, 1994

Related U.S. Application Data

[63] Continuation-in-part of Ser. No. 193,299, Feb. 8, 1994.

[51] Int. Cl.$^6$ ..................................................... A47B 81/06
[52] U.S. Cl. .......................... 181/199; 181/207; 181/208
[58] Field of Search ................................... 181/207, 208, 181/209, 151, 199; 188/268, 378, 379, 380; 248/559

[56] References Cited

U.S. PATENT DOCUMENTS

| | | |
|---|---|---|
| 2,270,902 | 1/1942 | Rubisson . |
| 2,541,159 | 2/1951 | Geiger . |
| 3,102,722 | 9/1963 | Hamontre . |
| 3,160,549 | 12/1964 | Caldwell et al. . |
| 3,169,881 | 2/1965 | Bodine, Jr. . |
| 3,386,527 | 6/1968 | Daubert et al. . |
| 3,388,772 | 6/1968 | Marsh et al. . |
| 4,232,762 | 11/1980 | Bschorr . |
| 4,392,681 | 7/1983 | Raquet . |
| 4,627,635 | 12/1986 | Koleda ..................................... 188/268 |
| 4,734,323 | 3/1988 | Sato et al. . |
| 4,778,028 | 10/1988 | Staley . |
| 5,170,436 | 12/1992 | Powell ................................ 181/199 X |
| 5,240,221 | 8/1993 | Thomasen . |

FOREIGN PATENT DOCUMENTS

| | | |
|---|---|---|
| 61-52153 | 3/1986 | Japan . |
| 2021501 | 12/1979 | United Kingdom . |

Primary Examiner—Khanh Dang
Attorney, Agent, or Firm—Thomas M. Freiburger

[57] ABSTRACT

A vibration attenuating device for loudspeaker enclosures and other mechanical vibrating bodies includes one or more damping plates of viscoelastic material positioned to receive vibration energy transferred from the vibrating body. The vibration energy is transferred away from the speaker enclosure or other body and is dissipated as heat due to the internal molecular structure of the viscoelastic material, suppressing noise normally produced by the vibrating body. In various different embodiments, the vibration damping device includes damping plates shaped or mounted in such a way as to provide for attenuation of a wide band of frequencies of vibration. The damping plates themselves may each have a configuration providing for continuously varying frequency response along the length or circumference of the plate, and there may be included a plurality of different-sized plates, each responding essentially to a different frequency band. Instead of applying forces or structural restraints in an attempt to restrain a speaker enclosure from vibration in response to a speaker driver, the device of the invention provides a path for transfer of these vibrations to plates where they can be dissipated primarily internally, greatly suppressing sound produced by the speaker enclosure panels. Provision is made for response by the damping device to a wide range of frequencies of vibration.

13 Claims, 12 Drawing Sheets

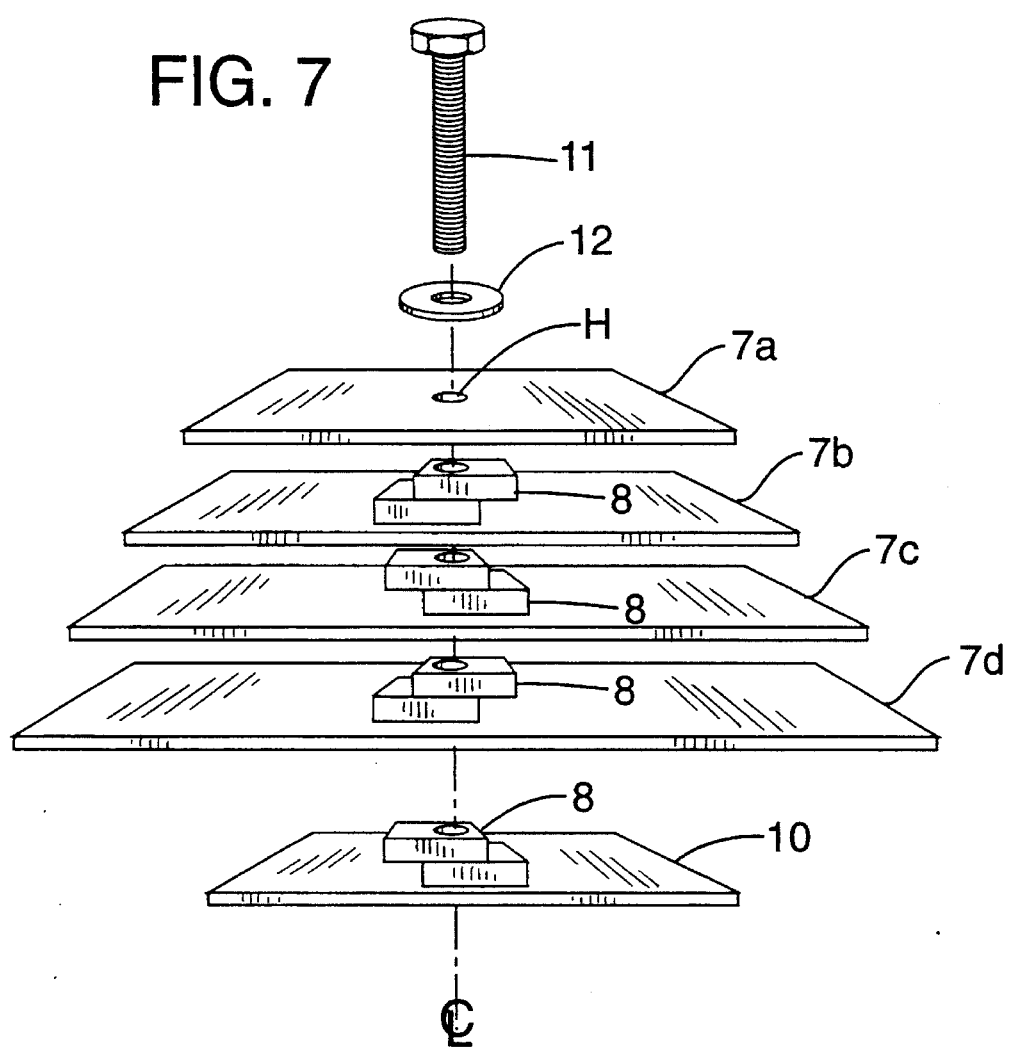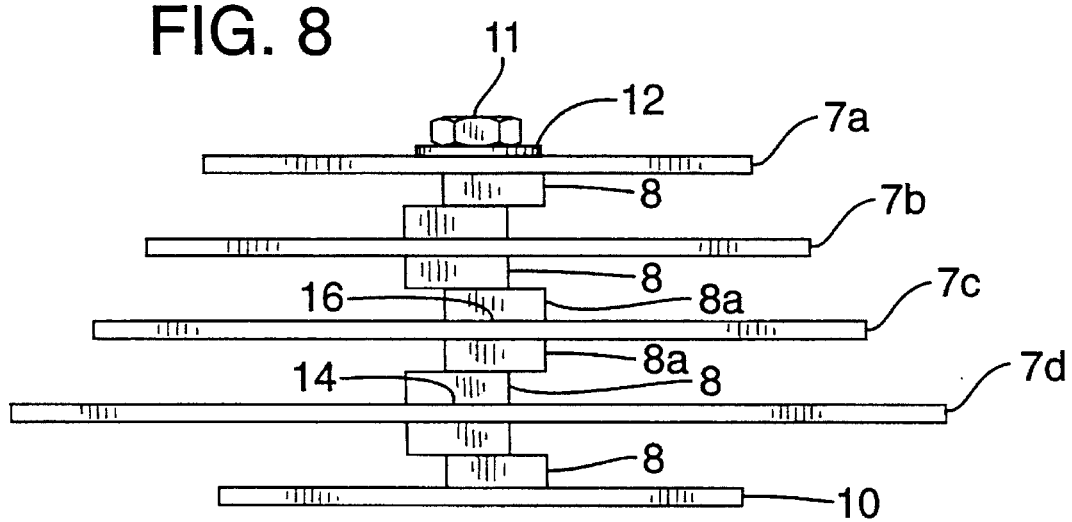

VIBRATION DAMPING DEVICE

REFERENCE TO RELATED APPLICATION

This application is a continuation-in-part of Ser. No. 193,299, filed Feb. 8, 1994.

BACKGROUND OF THE INVENTION

This invention relates to a vibration absorbing device for reducing or eliminating vibrations in bodies that are subjected to periodic or oscillating stress. More specifically, it is based on the realization that mechanical energy, the source of all vibrations, can be transmitted in the form of periodic stress through a mechanical continuum comprised of two or more elastic solids.

The present invention therefore teaches that periodic stress can be transmitted directly from one elastic body, in which the periodic stress first originated, into a second elastic body comprising a vibration absorbing damping plate or a plurality of such damping plates. In practice, these plates may either be selectively tuned to specific frequencies or they may be tuned in a manner that causes their frequencies of natural resonance to vary continuously over a selected broad wavelength band of vibrations. Consequently, the damping plates will resonate sympathetically in response to any periodic stress that may be transmitted into them from a vibrating body. During such a continuous energy transmission process, the damping plates are excited into sympathetic resonance, causing mechanical energy, the source of all vibration, to be dissipated, not as much in the body in which this energy first originated, but more so in the vibrating modes of the damping plates comprised in the vibration absorbing device of this invention.

Such a vibration absorbing device is capable of reducing or eliminating vibrations conducted in solids, particularly vibrations which emanate from loudspeaker enclosure panels and wall elements whereby the vibration absorbing device, when mounted directly to the loudspeaker enclosure or wall, absorbs vibrations, not by exerting opposing or restraining forces on a vibrating body as a means of attenuating the vibrations, but by functioning as an independently tuned, mass-spring system. It may contain a single vibration absorbing damping plate or a plurality of such damping plates, the cross-sections of which are shaped and affixed to spacer and mounting means in such a manner that their natural resonances are either tuned to specific frequencies or to continuously varying frequencies within a selected broad wavelength band or bands of vibrations.

Vibrations that are produced in elastic solids represent the recovery of mechanical energy that has been stored in the body. Accordingly, in loudspeaker enclosures, the loudspeaker drivers, which are mounted to the enclosure, transmit mechanical energy into the enclosure, causing the enclosure panels to vibrate. The problem that arises with this is that the panel radiated sound waves resulting from these panel vibrations will not be synchronized with the loudspeaker's direct sound waves. Instead, these sound waves will be somewhat delayed behind the loudspeaker's direct sound waves, thereby causing phase and amplitude errors in the sound radiation pattern of the loudspeaker. These response errors will therefore cause a listener to perceive sounds emanating from the loudspeaker as being distorted, thereby causing listening fatigue. In addition, the periodic stress that is transmitted into walls by sound waves emanating from a loudspeaker or other energy source will cause the wall to vibrate. The resulting sound waves that are radiated back into a room by these wall vibrations are known to be destructive and will therefore have a deleterious acoustical effect upon a listener. Thus, eliminating vibrations from loudspeaker enclosures and walls, and the deleterious acoustical effect that these vibrations have upon listeners, would be a major step in achieving flawless fidelity in the reproduction of sound.

Heretofore, a wide variety of vibration damping methods have been proposed or implemented to reduce or eliminate vibrations and their deleterious effect upon listeners. For example, in loudspeaker enclosures, rigid braces are often used as a means of offering resistance against the inside walls of the enclosure panels and thus reduce the panel vibrations. However, in practice, such bracing techniques will have little effect in reducing panel vibrations at those locations in the enclosure where no such bracing is employed. The enclosure, with its remaining panels free to oscillate sympathetically in response to the periodic stress propagating through them will therefore continue to vibrate and radiate delayed energy sound waves into the adjacent air.

Still other vibration absorbing devices have been proposed or implemented to attenuate vibrations in elastic solids. Two such devices, one of which is described in U.S. Pat. No. 2,270,902 to Rubissow and the other in U.S. Pat. No. 4,392,681 to Raquet, are comprised of A heavy weight or a plurality of such weights which, due to their inert mass, are disposed to exert opposing forces upon a vibrating body by means of a rubbery or spongy intermediate member that is layered between the heavy weight and the vibrating body. As a result, the vibrations are attenuated because a portion of the mechanical energy causing the body to vibrate has been dissipated through compression of the rubbery intermediate member residing between the heavy weight and the vibrating body. However, these types of vibration absorbing devices, by relying on opposing forces which are made available by an inert mass to retard the velocity of a vibrating body and thus reduce the amplitude of the vibrations, are limited in their ability to absorb vibrations from certain vibrating bodies, particularly from loudspeaker enclosures and walls. This is because, unlike the present invention, these devices are not comprised of bodies that are freely suspended and specifically tuned to receive by way of direct transmission, and to recover from the entire vibrating body by way of sympathetic resonance, a major portion of the periodic stress propagating throughout the entire body. Consequently, a major portion of this periodic stress will continue to be recovered as vibrations at those locations in the loudspeaker enclosure or wall where neither of the vibration absorbing devices described in U.S. Pat. Nos. 2,270,902 and 4,392,681 has been attached to oppose the periodic forces and attenuate the vibrations.

Another device and method that has been implemented to attenuate vibrations in a vibrating body is a vibration absorbing assembly developed by the application in this invention and described in U.S. Pat. No. 5,240,221. However, this device differs from the present invention in the following respects:

It is well known that the periodic or oscillating stress that loudspeaker enclosures are subjected to during a loudspeaker's operation will propagate at high velocity throughout the entire enclosure. Since the values in mass and compliance which govern the natural resonance frequencies of the individual enclosure panels and portions of these panels are vast in number, it can be expected that most loudspeaker enclosures and walls will vibrate over a vast number of different frequencies, all of which reside in the audible sound spectrum. In view of the foregoing, it will be seen that the damping plates comprised in the vibration absorbing assembly described in U.S. Pat. No. 5,240,221 are shaped in their cross-sectional area and affixed to spacer and mounting means in a manner that limits their natural resonance modes to a relatively small number of specific frequencies. Consequently, these damping plates will not be able to produce a wide range of natural resonances that continuously vary in sympathetic response to vibrations that, in loudspeakers and walls, are know to vary continuously throughout a broad range of frequencies residing in the audible sound spectrum.

In view of the above, it is the aim of the invention to achieve the following objects, singly or in combination:

To provide a vibration absorbing device comprised of damping plates that are composed of imperfectly elastic materials, whereby the damping plates may either be selectively tuned to one or more specific frequencies or they may be variably tuned to resonate sympathetically with the continuously varying periodic stress generated in the vibrating body to which the vibration absorbing device is connected and, thereby, since the damping plates are composed of materials that are imperfectly elastic in nature, recover such periodic stress in the bending modes of the damping plates as heat.

To connect the vibration absorbing device to a vibrating body and thus form a mechanical continuum comprised of the vibrating body and the vibration absorbing device wherein the specifically tuned or variably tuned damping plates comprised in the vibration absorbing device are able, by reason of their imperfectly elastic material composition, tuning and lower inert mass, to recover as heat the periodic stress propagating through the continuum.

To connect to a loudspeaker enclosure panel a variably tuned damping plate or a plurality of such plates wherein the single plate or the plurality of such plates are provided a total surface area approximating that of the speaker enclosure, with mounting means shaped in such a way and having such area so as to keep the damping plates continuously coupled to the enclosure panel across the entire length of the panel to which they are connected and, in so doing, provide the opportunity for maximum transfer of mechanical energy from the enclosure into the variably tuned damping plates, thus causing a major portion of this energy to be dissipated in the damping plates, thereby making this energy unavailable in the enclosure to produce panel vibrations and their destructive audible effects.

To connect the vibration absorbing device with a vibrating body and thus add to the vibrating body a second body whose tuned damping plates have a combined mass that is less than that of the vibrating body thereby causing the damping plates, by reason of their specific tuning and lower inert mass, to be better suited for recovering mechanical energy that may be transmitted into them from the vibrating body than the vibrating body is itself.

To improve a vibration absorbing device in such a manner that, in contrast to prior art, it does not exert opposing forces either into itself or onto a vibrating body as a means of retarding the velocity of a vibrating body and thus reduce the amplitude of the vibrations.

To provide in the vibration absorbing device one or more damping plates stacked together, wherein each damping plate has a different cross-sectional area than the others, and by means of spacers to separate the plates from each other, to construct these spacers so that their opposite sides, which are in contact with adjoining plates, are offset in opposite directions from each other but at equal distances from the centers of the adjoining plates; and thus, through the combination of continuously varying plate sizes and offset spacers, to provide continuously varying values in mass and compliance that cause the damping plates in the vibration absorbing device to exhibit natural resonance modes that continuously vary in frequency over a selected broad wavelength band or bands of vibrations.

To provide a vibration absorbing device wherein the selectively tuned damping plates comprised in the device are supported by means of spacers which are positioned and affixed between the damping plates, thereby enabling the plates to vibrate freely in space in accordance with the mass and compliance factors which govern their natural resonance frequencies whereby the spacers, separating each damping plate from the adjoining plates, form a discrete transmission path for the direct transmission of mechanical energy from a vibrating body into all of the damping plates, thereby allowing periodic stress to excite the damping plates into sympathetic resonance giving them complete freedom to oscillate in free air, unimpeded in their motion by any other internal or external forces acting upon them.

SUMMARY OF THE INVENTION

According to the invention, there is provided a wide-band vibration absorbing device for attenuating vibrations of selected wavelengths produced by a vibrating body. The device includes one or more energy absorbing plate-shaped means, also referred to herein as damping plates, including plate-shaped or disk-shaped spacers to separate a plurality of damping plates. Also included is a mounting device, which may be in any of several different forms, to attach the damping plates to the vibrating body. The relative areas of the damping plates and the mounting device, are selected such that a single damping plate, or more preferably a plurality of such plates, vibrate at natural resonance frequencies which vary continuously as a function of position in the plate assembly, throughout a selected broad wavelength band or bands of vibrations.

One preferred embodiment of a vibration absorbing device according to the invention again includes a plurality of plate-shaped energy absorbing means or damping plates. The device also comprises a plurality of disk-shaped or plate-shaped spacers and a mounting device having a first spacer attached to it, whereby the combination comprised of the mounting device and first spacer is disposed between the vibrating body and a first damping plate such that the combination of mounting plate and first spacer transmits mechanical energy generated in the vibrating body to the first damping plate. The spacers preferably are offset from the centers of the damping plates. The relative areas of the first damping plate and the first spacer and the distance of the first spacer is offset from the center of the first damping plate are selected so that the first damping plate vibrates at natural resonance frequencies that vary continuously through the plate over a narrow first band of vibrations within a first selected broad wavelength band of vibrations. A second spacer is disposed between the first damping plate and a second damping plate, arranged in stacked relationship, and transmits mechanical energy originating in the vibrating body to the second damping plate. The relative areas of the second damping plate and the second spacer and the distance of the second spacer is offset from the center of the second damping plate are selected so that the second damping plate vibrates at natural resonance frequencies that vary continuously throughout the plate over a narrow second band of vibrations within the selected broad wavelength band of vibrations. The device may also comprise third and fourth damping plates and, depending on the wavelength band of vibrations to be attenuated, any selected number of such plates may be used, each of which has an area and dimensions that are different from those of the adjoining plates and arranged in succession with spacers offset so that each successive damping plate vibrates at natural resonance frequencies that vary continuously throughout the plate over a different narrow band of vibrations within a first selected broad wavelength band of vibrations.

According to a further feature of the invention, the damping effect of the vibration absorbing device is influenced by values that are assigned to the mass and compliance factors which govern the natural resonance frequencies of the damping plates. To obtain, for instance, an adequate degree of damping in a vibrating body wherein the vibrations are of a large magnitude, the thickness of the damping plates may be increased so as to lower their compliance while weights, such as steel, may be attached to the plates to increase their mass. In this manner, the overall size of the vibration absorbing device may be kept to a minimum and yet enable the damping plates to be specifically tuned or variably tuned so as to resonate sympathetically with the disturbing vibrations originating in the vibrating body. It has been found advantageous, even though metal weights are fastened to the damping plates, to maintain in the damping plates a total mass that is less than that of the vibrating body because, in the presence of less mass, there is less inertia to overcome and, consequently, the periodic stress originating in the vibrating body may transfer more readily into the imperfectly elastic damping plates and, in this transfer process, cause the damping plates to be excited into sympathetic resonance, thereby causing mechanical energy to be dissipated harmlessly in the vibrating modes of the damping plates as heat rather than in the vibrating body as audible vibrations. This is achieved in one embodiment of the invention by including a single damping plate or a plurality of such plates, each of which is edge mounted, thus providing for them a freely suspended position in the device, including metal weights and also edge mounted spacers to separate the damping plates not only from each other but also from a mounting means which attaches the device to a vibrating body. The plurality of damping plates are of successively differing sizes.

According to an alternative embodiment of the invention, an adequate degree of damping can also be obtained, without adding metal weights to the plates, by increasing the thickness and cross-sectional areas of the preferably viscoelastic damping plates, thereby obtaining values in their mass and compliance that will cause the plates to resonate over a selected broad wavelength band or bands of vibrations. Particularly good results have been achieved with a vibration absorbing device comprising a plurality of damping plates sufficient in number so that each plate is selectively tuned to resonate at frequencies that correspond to a narrow wavelength band of vibrations immediately adjoining other narrow wavelength bands of vibrations all of which reside within a selected broad wavelength band of vibrations.

DESCRIPTION OF THE DRAWINGS

FIG. 7 is a perspective exploded view of another embodiment of the vibration absorbing device of the invention, with the damping plates and mounting device shown separated from each other to illustrate the offset positioning of spacers relative to the damping plates.

FIG. 8 is a side view of the vibration absorbing device of FIG. 7.

DESCRIPTION OF PREFERRED EMBODIMENTS

Figure 1:
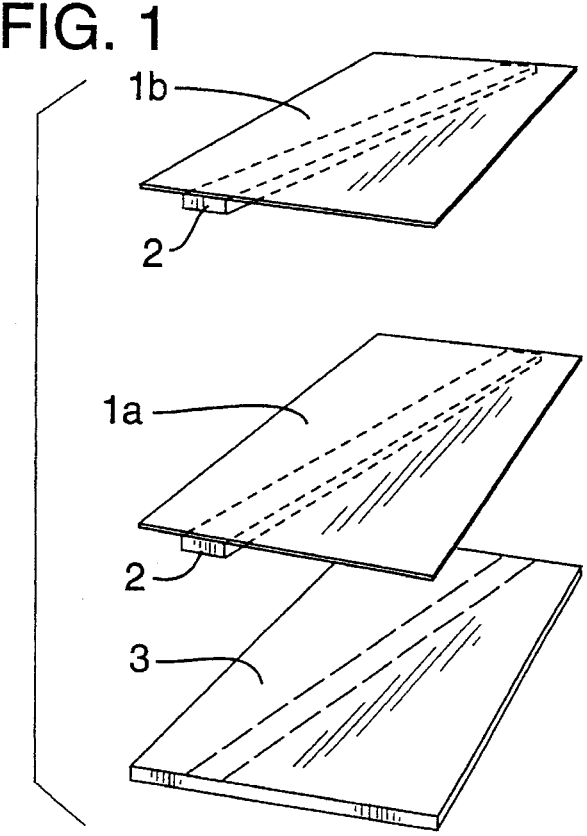
FIG. 1 is a perspective view of two vibration absorbing damping plates according to one embodiment of the invention, shown exploded and indicating a vibrating body directly below the two damping plates. A mounting device shown in this embodiment is angled.

Referring now to FIG. 1, a perspective view showing the structure of a first embodiment of the invention is shown. In this structure, plate 1a and mounting device or mounting plate 2 are securely fastened together to form essentially a monolithic structure. The mounting device 2 serves three important functions according to the invention: first, it prevents the plate 1a from coming into direct contact with the vibrating body 3 or any adjoining plate such as plate 1b (the body 3 has a dotted-line indication of where the mounting plate 2 will be secured). Second, the width of the mounting device 2 relative to the width of plate 1a governs the variable resonance frequencies of plate 1a. Third, the angle of the mounting device 2 with respect to the rectangular plate 1a governs the range of continuously varying frequencies over which the damping plate 1a resonates. It should be noted that the angle of mounting device 2 with respect to the rectangular plate 1a is an important feature of the invention for the following reason: it provides the damping plate 1a with a wide range of continuously variable natural resonance frequencies, thereby enabling plate 1a to recover, through sympathetic resonance, a wide range of vibrations originating in the vibrating body 3. Additional damping plates, such as plate 1b, which may be identical to plate 1a, may be securely fastened to plate 1a to increase the effective plate area with which to absorb vibrations through sympathetic resonance of the plates, for example, the combination of plate 1a and 1b. In this embodiment, plate 1a and 1b, when fastened together through a second mounting device or spacer 2 to form an essentially unitary structure, may be affixed, by using a suitable adhesive, to an appropriate vibrating body such as a loudspeaker enclosure. It should be noted, however, that such a structure comprising damping plates 1a and 1b may be mounted, through mounting device 2, onto vibrating surfaces other than loudspeaker enclosures, still providing beneficial attenuation characteristics. Those skilled in the art will recognize that the dimensions of plate 1a, the dimensions of mounting device 2, the thickness of plate 1a, the angle of mounting device 2 with respect to plate 1a, and the distance between the plates and the vibrating body 3, will define the wavelength band to which the structure comprised of plate 1a and 1b is tuned. Thus the structure may be shaped and apportioned in size to absorb vibrations of continuously varying frequencies over a broad wavelength band or bands of vibrations.

Figure 2:
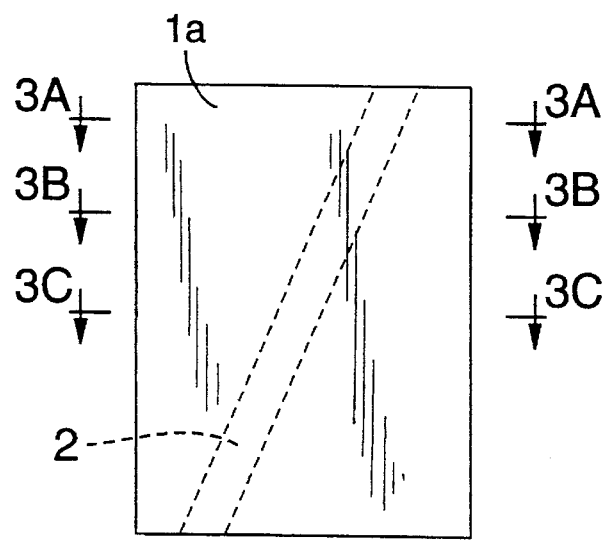
FIG. 2 is a plan view showing one of the damping plates of FIG. 1, and showing in dashed lines the mounting device located behind the damping plate.
Figure 3A:
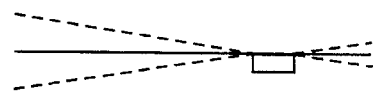
FIGS. 3A, 3B and 3C are three cross-sectional views of the damping plate of FIG. 2, as seen along the lines 3A, 3B and 3C in FIG. 2, illustrating the vibration behavior of the damping plate with respect to the varying positions of the mounting device on the damping plate.
Figure 3B:
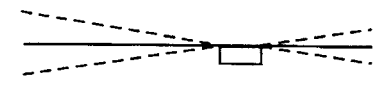
Figure 3C:
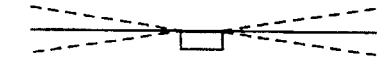

A front view of plate 1a of this first embodiment is shown in FIG. 2. The mounting device 2 is seen hidden. In FIG. 2 are shown section lines 3A, 3B and 3C. In FIG. 3, these section lines illustrate the varying resonance behavior of plate 1a with respect to sections 3A, 3B and 3C along the length of the plate 1a. From this, those skilled in the art will recognize that an infinite number of sections along plate 1a would reveal that an infinite number of different natural resonances modes will be produced along the length of the plate due to the angle at which mounting device 2 is positioned onto plate 1a and thus the different freely suspended length for vibration. In the embodiment shown in FIGS. 1, 2, and 3, the vibration absorbing device may contain two absorption plates 1a and 1b with two mounting devices or mounting plates 2 which also serve as spacers to separate plates 1a, 1b and the vibrating body 3 from each other. In this embodiment, the thickness of the plates 1a and 1b is preferably about ⅛ inch and the thickness of the mounting device may be about ¼ inch. The plates 1a and 1b are identical in size, and each may be about 11 inches in width and 23 inches in length. It is to be noted, however, that these thicknesses and shapes may be substantially varied yet still obtaining good attenuation characteristics. Varying thicknesses and cross-sectional areas of the vibration damping plates versus mounting devices, relative to one another, and the angle of the mounting plates relative to the plates simply adjusts the continuously varying natural resonances of the structure to different wavelength bands and the particular wavelength band for a given construction is easily determined by applying vibrational stress to the structure and measuring the resulting resonances produced by the damping plates. This is most easily achieved by trial and error with the aid of standard accelerometer measuring techniques.

Figure 4:
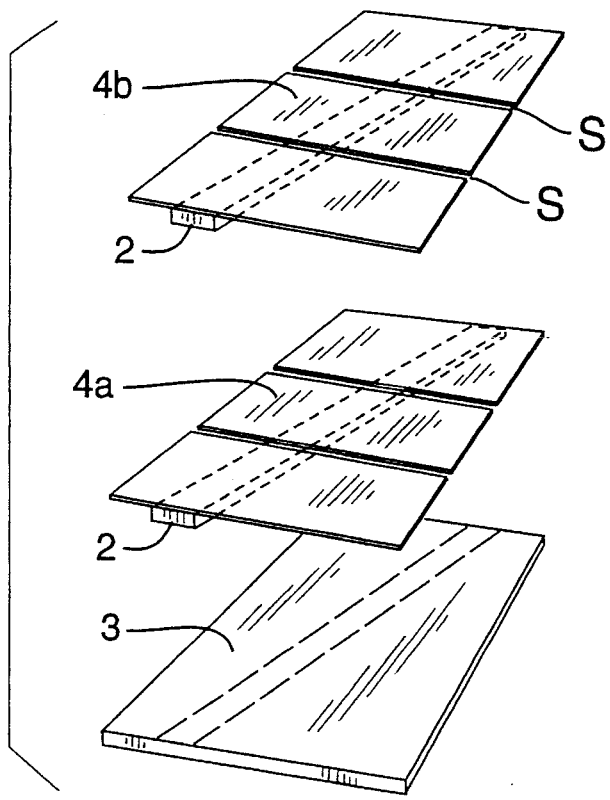
FIG. 4 is an exploded perspective view of another embodiment of the invention showing two vibration absorbing plates similar to those of FIG. 1, with the exception that the two damping plates are severed along their edges. A vibrating body is shown directly below the two damping plates with the damping plates and vibrating body separated from each other to illustrate alignment.

Referring now to FIG. 4, it is shown that this embodiment is similar to the embodiment of FIG. 1 with the exception that plates 4a and 4b are severed at two locations along both edges of the plates. Severing the plates 4a and 4b in this manner, by gaps or spaces S, separates each plate into six segments, thus providing the plate with discrete energy transmission paths at those areas on the plate that are more sympathetic and, therefore, more attuned than other areas to respond, at any instant, to specific narrow bands of vibrations. It is to be noted that plate 4a may be severed so as to provide any number of plate segments to meet individual attenuation requirements. The results obtained by severing the plate into segments can be observed by applying vibrational stress to the plate and measuring the response of each segment with the aid of standard accelerometer measuring techniques.

Figure 5:
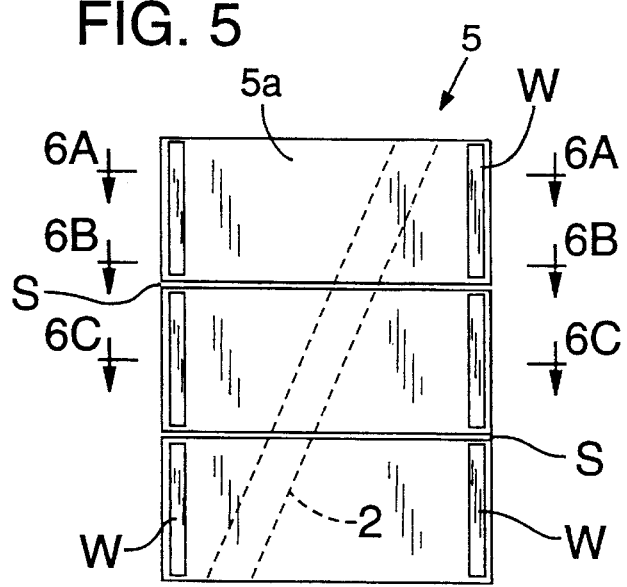
FIG. 5 shows a further embodiment of the invention, similar to the embodiment of FIG. 2 but including metal weights secured to the edges of the plate at six locations.

Referring now to FIG. 5, a vibration absorbing device 5 is shown having a plate 5a which is similar to the embodiment of FIG. 4 with the exception that, in this embodiment, the damping plate 5a has metal weights W secured to the edge of each of six plate segments formed by severing the plate at locations S. In this embodiment, the thickness of the damping plate 5a may be about ¼ inch. Selecting the thickness of the plate 5a and, therefore, the resulting compliance of the plate at the various segments along the edges of the plate determines the mass in each metal weight W that is required to achieve a specific frequency of natural resonance from each segment of the plate. Lowering the compliance in each segment of the plate by increasing the thickness of the plate is advantageous where large amplitudes of vibrations are produced by a vibrating body. This added thickness enables the embodiment of FIG. 5 to be effective in absorbing vibrations without increasing its size. Once the compliance values in the plate 5a have been lowered, metal weights W are selected and secured to the edges of the plate segments to add a specific mass that will tune the plate 5a to resonate at continuously varying frequencies over a selected broad wavelength band or bands of vibrations. Securing the metal weights W to the edges of each plate segment is achieved by first sanding the edges of the plate segments and metal to roughen their contact surfaces. A pure silicone adhesive has been found suitable for attaching the metal weights W to the plate segments.

Figure 6A:
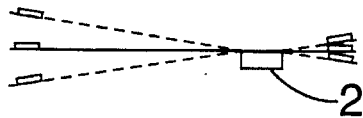
FIGS. 6A, 6B and 6C are three different cross-sectional views of the damping plate of FIG. 5, seen along the lines 6A, 6B and 6C in FIG. 5, illustrating the vibration behavior of a damping plate with respect to the varying positions of the mounting device on the damping plate.
Figure 6B:
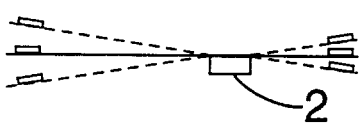
Figure 6C:
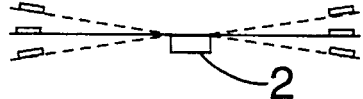

FIGS. 6A, 6B and 6C show the plate 5a as taken from section lines in FIG. 5 wherein the response characteristics of the vibrations in plate 5a are shown in terms of amplitude versus distance that the plate extends beyond mounting device or mounting strip 2. It is seen, of course, that the longer distances describe the lower frequencies along with greater amplitudes, while the shorter distances describe the higher frequencies along with smaller amplitudes.

FIG. 7 is a perspective view of another embodiment of the present invention. In this structure, plates 7a, 7b, 7c and 7d are separated from each other by identically constructed spacers 8. A pair of spacers 8 resides on opposite sides of each plate, in juxtaposition. The spacers each have an off-center hole with two opposed eccentrically positioned spacers between each pair of adjacent plates. All spacers may be equal in thickness, although this is not necessary. The spacers 8 which are eccentrically positioned together between adjacent plates may comprise two identical spacers which are oppositely offset from the center line of the assembly, or these stacked spacers may comprise one monolithic body, with lower and upper portions which preferably are equal in thickness and dimensions except that each portion is offset from the other portion by an equal distance from the center of the spacer and from the center line so that the lower portion extends beyond center line in one direction while the upper portion extends beyond the center line in the opposite direction by 180 degrees.

In the appended claims the characterization of spacer disks as a pair of disks juxtaposed on opposite sides of a plate should be understood to refer to either the arrangement wherein the spacer structure between pairs of adjacent plates is a monolithic or integral piece, or the situation wherein a pair of similar spacers 8 are stacked with opposite eccentricities as shown in FIG. 7 to create the desired effect on each plate. The plates themselves preferably are concentrically mounted as shown, with the spacers 8 providing the eccentric mounting means to continuously vary the freely extended plate length around the perimeter of the plates.

The rectangular plates 7a, 7b, 7c and 7d have cross-sectional areas which are different from each other, and each plate has a hole H provided at its center for mounting. It is seen in FIG. 7 that the length of each plate becomes progressively smaller from plate 7d to plate 7a so that a wide band of continuously varying frequencies is covered by the series of plates. In this embodiment, the widths of the plates may be equal to each other; however, the widths could become progressively smaller also if desired, producing somewhat different tuning characteristics. A bolt or screw 11 may be used to secure the assembly together (with a washer, as shown), and also to the vibrating body if desired. A mounting plate 10 is shown in the assembly, for directly contacting and coupling to the vibrating body.

FIG. 8 is a side view of the embodiment of FIG. 7. In this view, the rectangular mounting plate 10 has a threaded hole at its center in this embodiment, and positioned onto it is a first offset spacer 8 which may be integral with upper and lower oppositely offset portions. The lower and upper portions of spacer 8 are offset by an equal distance but in opposite directions from the center hole of mounting plate 10, similar to spacers between plates. The upper portion of this integral spacer is directly opposite the lower portion of the spacer above the damping plate 7d, so that the plate has an offset plate fixation area 14 defined between the opposed spacers 8 on either side. Damping plate 7c is similarly held eccentrically by an offset plate fixation area 16 defined by another pair of offset portions 8a as shown. Tightening the bolt 11 into the threaded hole in the mounting device 10 completes the embodiment of FIG. 8. It will be recognized by those skilled in the art that each plate in the embodiment of FIG. 8 will exhibit continuously varying resonance modes within a wavelength band that is different from that of the other plates and whose frequencies overlap partially into those of the next adjoining plate wherein the frequencies of resonance in the plates increase progressively as the plates comprised in the embodiment of FIG. 8 become progressively smaller. It will also be recognized by those skilled in the art that the size of the plates, the thickness of the plates, the materials used in the plates, the size and offset dimensions of the spacers, the thickness of the spacers, and the distance between the plates and a vibrating body will contribute to defining the wavelength band to which the illustrated device is tuned. The device of FIG. 8 can therefore be shaped and apportioned in size to absorb vibrations of continuously varying frequencies over a broad wavelength band or bands of vibrations.

Figure 9:
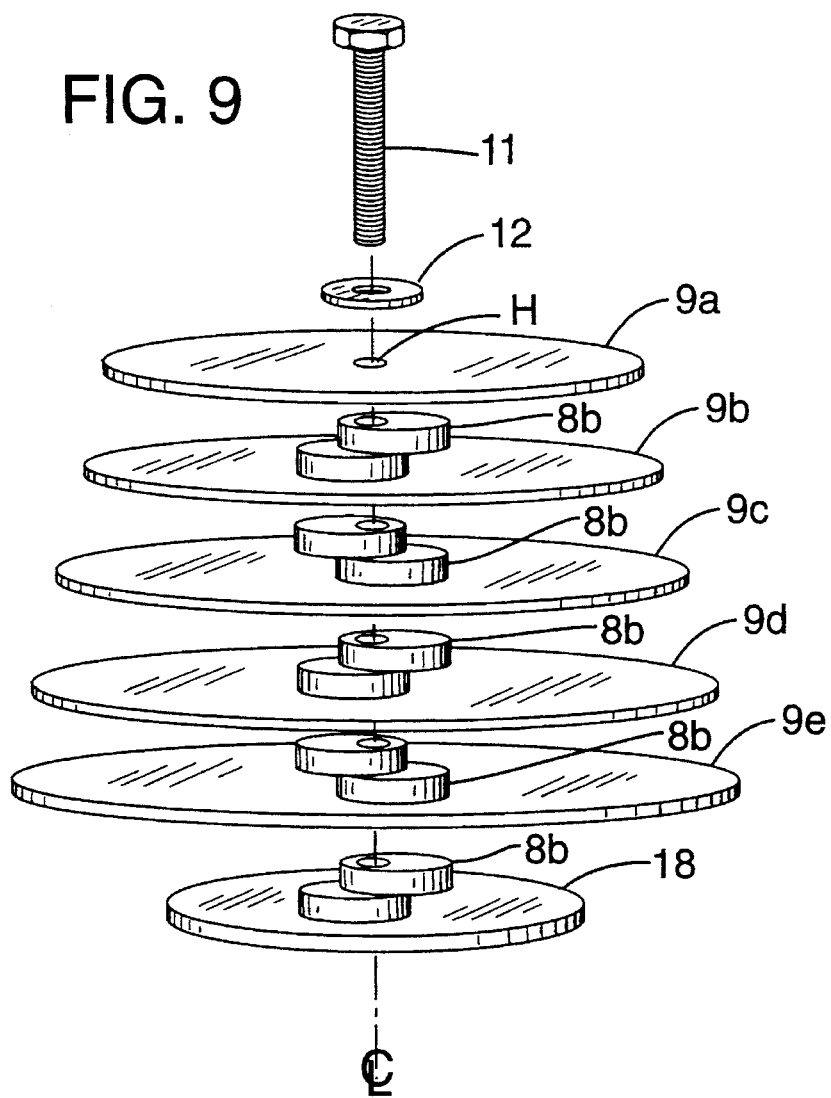
FIG. 9 is a perspective exploded view of another embodiment of the vibration absorbing device of the invention, similar to FIG. 7 but with the damping plates and mounting plate of a different shape.
Figure 10:
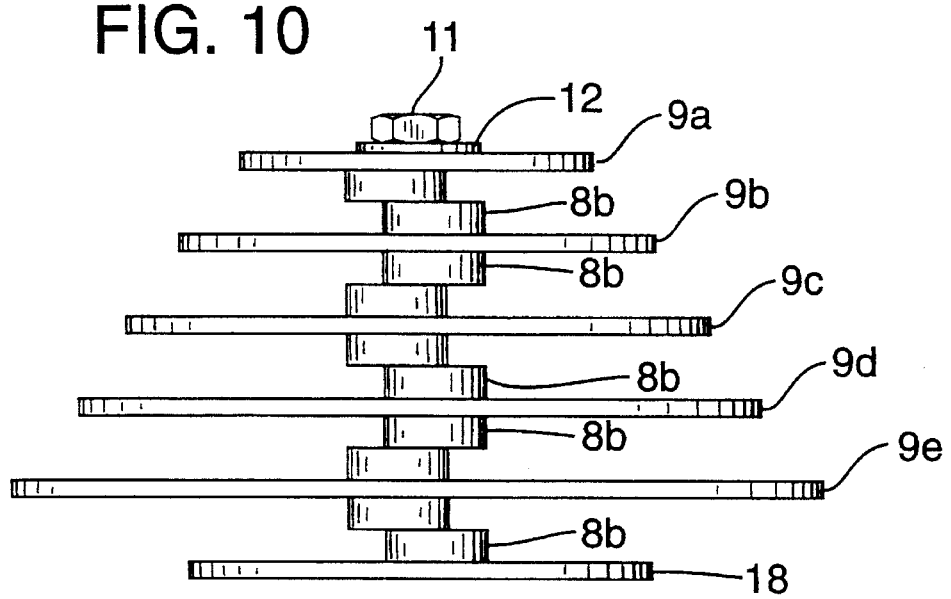
FIG. 10 is a side view of the vibration absorbing device of FIG. 9.

The embodiment of FIGS. 9 and 10 differs from that of FIGS. 7 and 8 only in that the damping plates 9a, 9b, 9c, 9d and 9e are circular rather than rectangular. Spacers 8b preferably also are circular. With the plates, circular and each being smaller in diameter than the previous larger plate, the identically constructed offset spacers will cause the damping plates to resonate at a continuously varying rate around each plate and through all of the different sized plates, thereby causing the transition from one relatively narrow band of vibrations into another narrow band of vibrations to occur smoothly throughout a selected broad wavelength band of vibrations.

Attaching the device of FIGS. 9 and 10 to a vibrating body may be achieved with good results by means of a flexible magnetic pad (not shown) bonded onto a mounting plate 18, with a magnetic pad of equal size bonded onto the vibrating body. When the two bodies comprising the magnetic pads are positioned onto each other, the magnetic attraction thus provided will keep the device securely coupled to the vibrating body. However, any appropriate method for attaching the device to a vibrating body may be used, for example, epoxy glue, bolts, screws or other suitable adhesive. For the device of FIGS. 7–8 similar mounting methods may be used.

Figure 11:
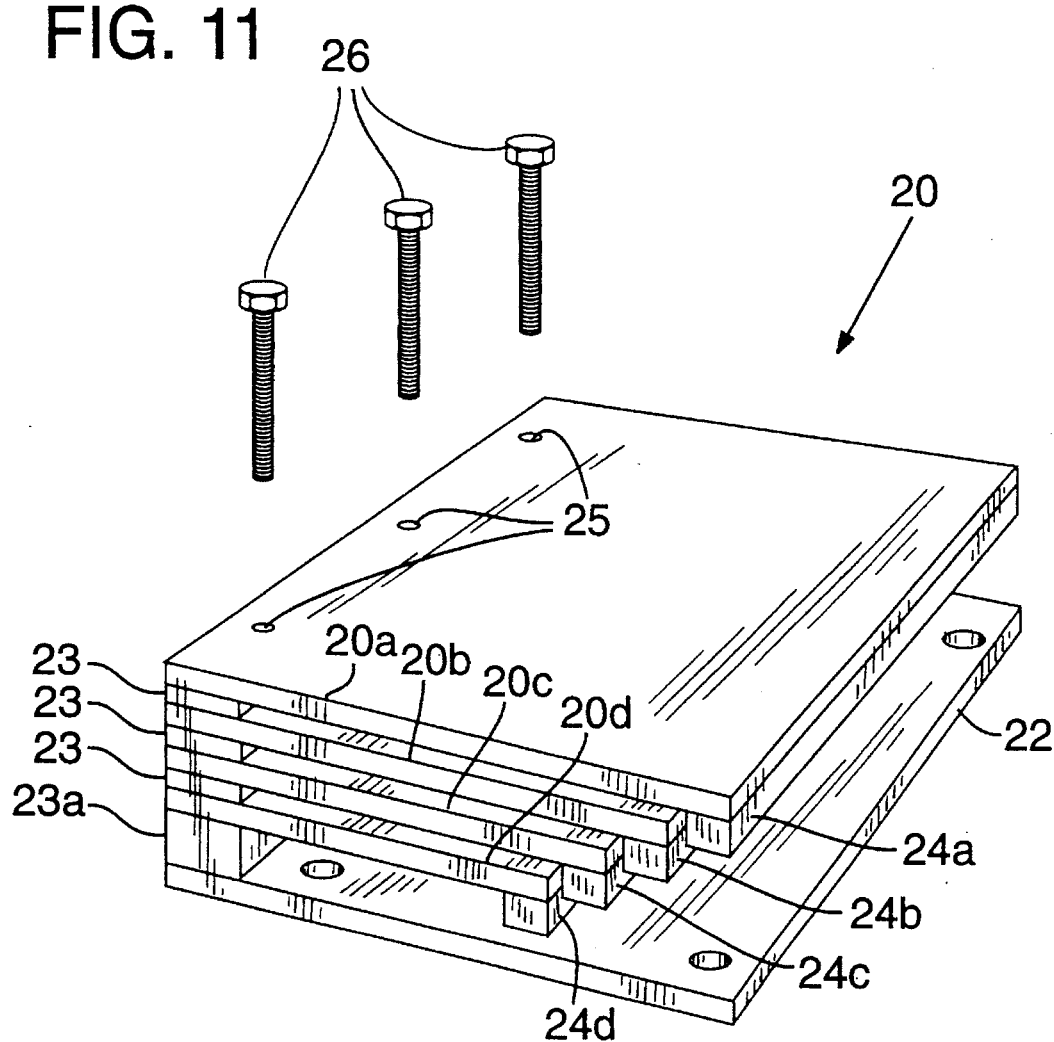
FIG. 11 is a perspective view, partially exploded, of another embodiment of the vibration absorbing device of the invention with weights on the damping plates.

FIG. 11 is a perspective view of a different embodiment of the invention, wherein damping plates are held by one edge with successively different cantilevered lengths but not necessarily including continuously varying length in each plate. In this structure 20, plates 20a, 20b, 20c and 20d are positioned in descending sizes toward a mounting device or plate 22 with spacers 23 and 23a positioned between and at the edge of each plate. Holes 25 to receive bolts 26 are provided near the edge of all plates and in all spacers 23 and 23a, as shown, including through the mounting plate 22. The embodiment of FIG. 11 is intended for attenuating vibrations in vibrating bodies in which the amplitude of the vibrations is large due to high energy levels in the vibrating body. For this reason, damping plates 20a through 20d in this embodiment may be about ¼ inch thick, and all may have a width of about 10 inches and lengths which vary in descending order as illustrated. The lengths in a preferred embodiment can vary from-about 8 inches down to about 5 inches, cantilevered as shown. These dimensions provide the four plates with values in compliance such that when steel weights 24a, b, c and d are selected appropriately and secured to the four plates, four different but specific resonance modes are established in the device. Adjusting the mass-compliance values in this manner tunes the four damping plates in the device to respond sympathetically to four specific resonance modes which, in the vibrating body, are found to be disturbing. It should be noted, however, that any number of damping plates may be included in the embodiment of FIG. 11 to attenuate unwanted vibrations.

Figure 12:
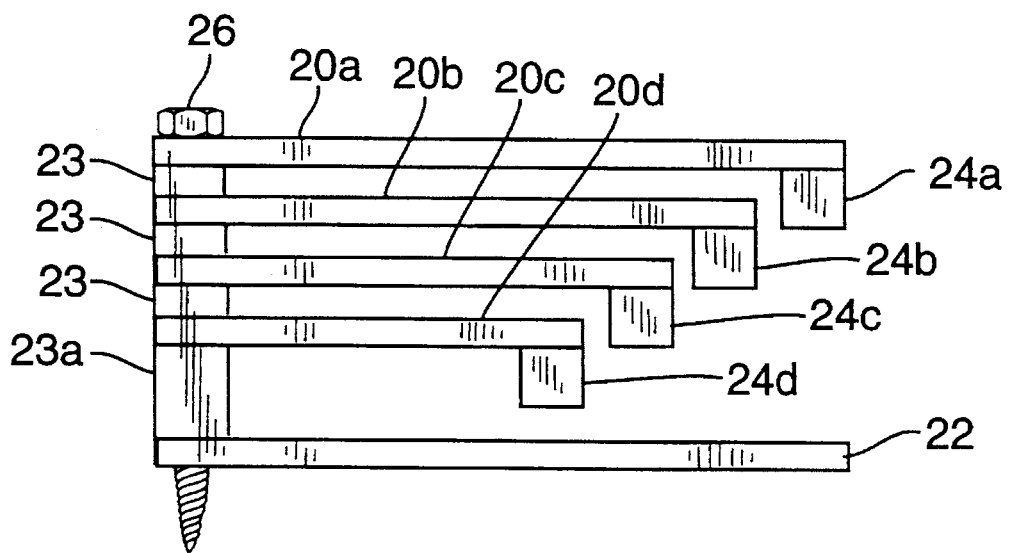
FIG. 12 is a side view of the vibration absorbing device according to FIG. 11.

It has been found advantageous to mount the steel mass 24a, 24b, etc. onto the edges of the damping plates by first sanding to thereby roughen the edges of both the steel mass and the damping plates where they join together. A pure silicone adhesive has been found suitable to affix the steel mass to the damping plates. It has been found preferable to affix the steel mass to the damping plates prior to assembling the plates into the device. Since the embodiment of FIG. 11 is intended for attenuating high energy vibrations, it is preferable to mount the device tightly to a vibrating body by means of the bolts or screws 26 passing through the mounting plate 22 and into the vibrating body. Thus, the screws 26 shown in FIG. 12 are shown passing through the mounting plate 22. Additional screws or bolts should be included to secure the plate 22 to the vibrating body, or adhesive in addition to such fasteners.

FIG. 12 shows in side elevation view the embodiment of FIG. 11. The mounting plate 22 is contacted with a vibrating body, not shown, that transmits mechanical energy through the edge mounted spacers 23. The mounting device 22, spacers 23 and 23a, and weights 24a through 24d, are all preferably made of steel for good energy transmission into the damping plates 24a–d. Periodic stress transfers into damping plates 20a, 20b, 20c and 20d causing them to be excited into sympathetic resonance. When the damping plates in the device are composed of viscoelastic materials, as is preferred, a major portion of the mechanical energy transferring into them from a vibrating body will be dissipated in the-bending modes of the damping plates as heat.

It is to be noted here that all of the embodiments of the present invention are preferably provided with damping plates composed of a viscoelastic poller; specifically, a preferred material is a high-impact polystyrene or rubber-modified polystyrene. An example of a high-impact polystyrene suitable for damping plates and spacers according to the invention is STYRON 479 high impact polystyrene resin. This high-impact polystyrene contains 8–10% butadiene and has a specific gravity of 1.05 g/cm$^3$ and a flexural strength of 4,700 lbs/in$^2$. It should be understood that the spacers can be formed of elastic materials, if desired.

By elastic materials, it is meant a material composed of small individual atoms bonded in crystalline lattices. Whenever elastic bodies are subjected to periodic or oscillating stress, there will be rapid short-range bending and stretching of interatomic bonds and rapid elastic response. Consequently, whenever such elastic materials are subjected to periodic or oscillating stress, the resulting periodic strain will be exactly in phase. Steel and other very hard materials are examples.

By viscoelastic materials, it is meant a material composed of extremely high-molecular-weight molecules bonded in long chains of repeating polymer molecules. Consequently, when viscoelastic bodies are subjected to periodic or oscillating stress, there will be a slower coiling and uncoiling of the long chain polymer molecules. The resulting twists, coils and convolutions in the polymeric matrix produce internal molecular friction. To the extent that the high-molecular-weight molecules cannot yield quite fast enough before the high velocity periodic forces affecting them, there will be a delay in the response of a viscoelastic body to these periodic forces. This delay in response results in hysteresis loss, which is defined as the loss of energy due to the lag in response of an imperfectly elastic material to the forces affecting it. This delay in response is evidenced by the fact that whenever a viscoelastic body is subjected to periodic or oscillating stress, the resulting strain will neither be exactly in phase, as it would be in a perfectly elastic body, nor 90 degrees out of phase, as it would be in a perfectly viscous liquid. Instead, the resulting strain will be somewhere between these two conditions. Consequently, due to the effects of hysteresis, when the vibration absorbing device of this invention, including all the embodiments thereof, is subjected to mechanical energy originating in a vibrating body, this energy, as it transfers into the device, excites the viscoelastic damping plates into sympathetic resonance, thereby causing this energy to be dissipated harmlessly in the bending modes of the damping plates as heat.

Figure 13:
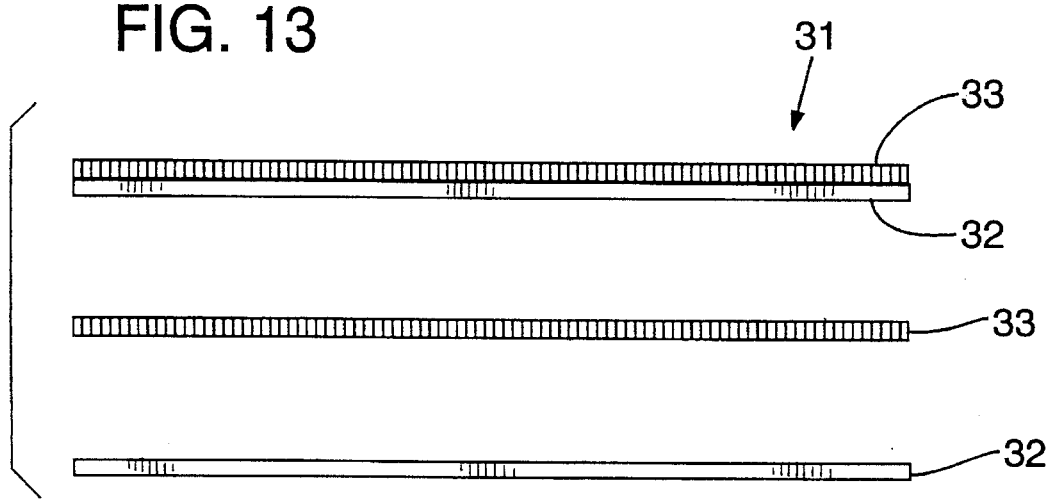
FIG. 13 illustrates in section or side elevation a vibration absorbing plate according to the invention, composed of a layer of a viscoelastic material and a layer of an elastic material, each of which is also shown separately below the layered damping plate.

FIG. 13 illustrates a lamination or layered damping plate 31 which may comprise some of the damping plates embodied in the invention. Damping plate 31 is comprised of a combination of a highly elastic plate 32 and a viscoelastic plate 33, shown separately below the layered plate 31. Damping plate layer 32 may consist of a material such as steel, aluminum, or high-density fiberboard. Damping plate layer 33 may consist of ABS (terpolymer of acrylonitrile butadiene and styrene), polyamides such as nylon 66, polycarbonates, polyethylene, polypropylene, polystyrene, styrenebutadiene copolymers and polyfluorocarbons such as polytetrafluoroethylene. A preferred material is high-impact polystyrene, also known as rubber-modified polystyrene, which has 8–10% butadiene or butadiene-styrene copolymers dispersed in a polystyrene matrix. An intermediate graft copolymer may be introduced to increase the compatibility between the polystyrene and butadiene phases. Damping plate 33 comprises a lamination of the two layers, or a coating of the viscoelastic layer 33 onto the elastic layer 32. The layer may alternatively be laminated using a suitable adhesive to bond the two materials tightly together.

Figure 14:
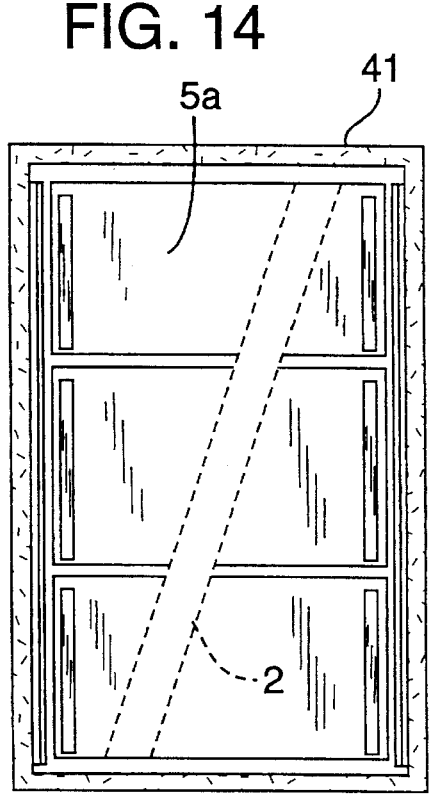
FIG. 14 shows a loudspeaker enclosure with the front panel removed to illustrate the vibration absorbing device of FIG. 5 mounted to the inside panels of the enclosure.

FIG. 14 is a front view of a loudspeaker enclosure 41 with the damping plate 5a of the embodiment of FIG. 5 of the invention secured to the inside rear and side panels of the enclosure. The damping plate 5a or a plurality of the damping plates, according to the invention, may be secured to the enclosure with a suitable adhesive or screws. The damping plate 5a, or a plurality of the plates, are installed in the enclosure in a manner that will leave clearance between the plate 5a and the enclosure panel, thereby preventing contact of the panel 5a with the enclosure panel. A mounting strip or plate 2 as in FIG. 5 may be provided for this purpose.

Figure 15:
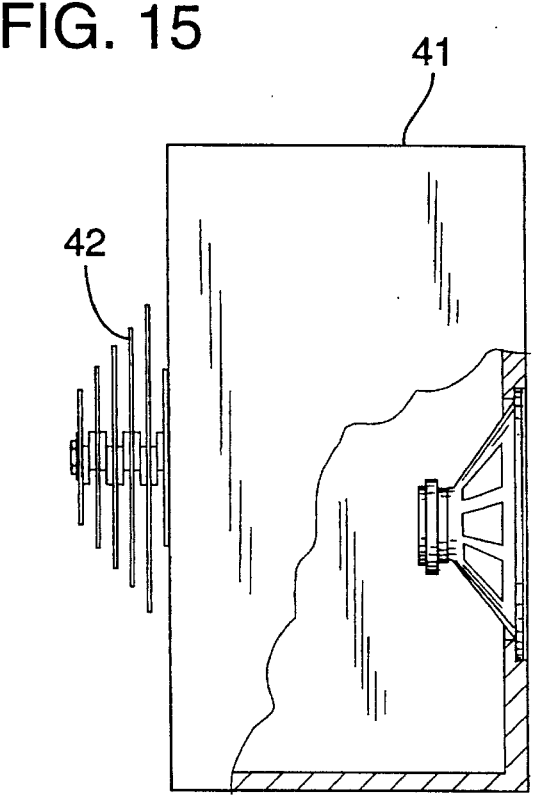
FIG. 15 is a side, partial cutaway, schematic view of a loudspeaker enclosure showing the vibration absorbing device of either FIG. 7 or FIG. 9 mounted to the rear panel of the enclosure.

FIG. 15 is a side view of a loudspeaker enclosure showing the embodiment of FIG. 7 or FIG. 9 of the invention mounted to the rear panel of the enclosure 41. The vibration absorbing device 42 may be mounted to the enclosure panel by first securing to the device 42 a flexible magnetic pad and affixing another such magnetic pad to the rear panel of the enclosure 41 where the device 42 is to be located. The resulting magnetic attraction between the two magnetic pads will therefore keep the device 42 securely coupled to the enclosure 41. Other methods of attachment such as adhesive, screws or bolts may alternatively be used. It is to be noted that the device 42 may also be secured to the inside of the enclosure and still obtain good attenuation of the enclosure panel vibrations.

Figure 16:
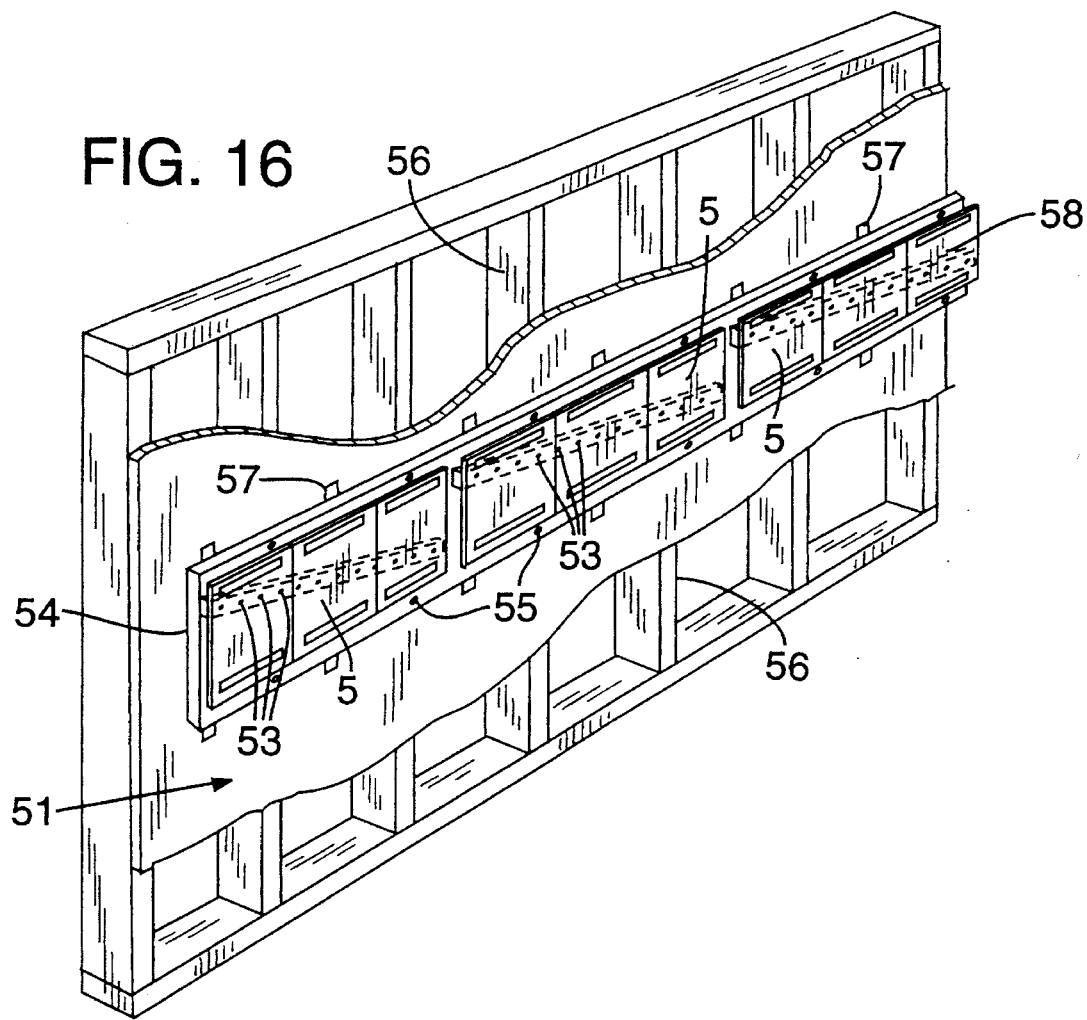
FIG. 16 is a perspective view showing a wall onto which is mounted three vibration absorbing devices as in FIG. 5.

FIG. 16 shows a wall 51 with the vibration absorbing device of FIG. 5 of the invention secured to the wall.

Securing the device 5 to the wall 51 preferably is achieved by first mounting a high-density fiberboard 54 to the wall. The fiberboard member 54 is attached to the wall by means of suitable screws 55 at each wall stud 56. A small strip 57 of thin dense material approximately one inch in width is applied between the wall and fiberboard member 54. These thin strips provide a means for establishing direct contact between the gypsum wallboard or plasterboard and the fiberboard member 54. Each strip is placed vertically between the wall 51 and fiberboard member 54 and positioned midway between adjacent wall studs 56. Tightening screws 55 compresses the fiberboard member 4 against the wall studs while compressing the thin strips 57 against the wall. This assures maximum coupling, thereby facilitating the transmission of mechanical energy from the wall into the vibration absorbing device 5. In this embodiment, a plurality of devices 5 are attached horizontally to the wall 51, leaving a space of approximately 2 inches between the attenuating devices. The fiberboard member 54 may be ¾ inch in thickness and its width may be constructed to be approximately two inches wider than the width of the device 5, thereby providing adequate space for installing the mounting screws 55. The device 5 is secured to the fiberboard member 54 with screws 53 spaced approximately two inches apart along the entire mounting strip 58 (shown by a broken line). In this embodiment, periodic stress originating in the wall 51 transfers directly through the fiberboard member 54 and mounting strip 58 into the damping plates 5a such that, since the material composition of the damping plates is purely viscoelastic in nature, the periodic stress will be dissipated in the bending modes of the damping plates as heat.

Figure 17:
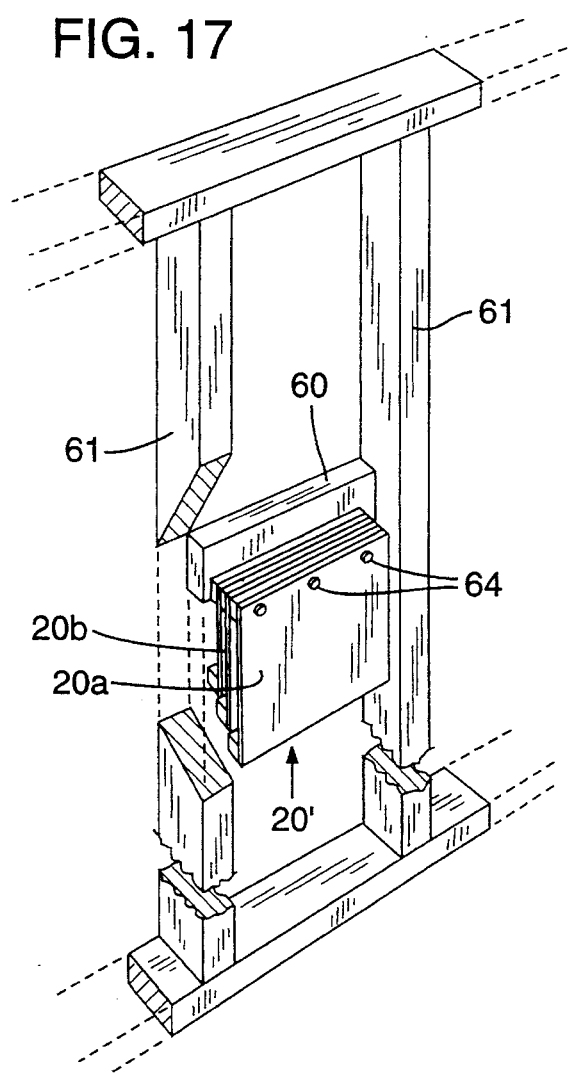
FIG. 17 is a perspective view showing a wall section into which the embodiment of FIG. 11 has been installed.

FIG. 17 is a perspective view of a wall section into which an attenuating device 20' similar to the device 20 of FIG. 11 of the invention has been installed. A wood block 60, measuring a nominal 2 inches by 6 inches, is cut to length and secured tightly between wooden wall studs 61. It has been found advantageous to apply wood glue to both ends of the block 60 prior to nailing the block securely into place between the wall studs 61. The preferred position of block 60 is midway between the floor and ceiling. The device. 20' is secured to block 60 using lag bolts 64. It can be seen that the device 20' differs from the device 20 of FIG. 11 in that the mounting plate 22 has been eliminated, with the stack of plates 20a, 20b, etc. and spacers mounted onto the wood block 60, spaced away from the block. However, the mounting plate 22 can be included if desired, mounted onto a larger wood block having a length at least as long as that of the mounting plate. Periodic stress transmitted into wall studs 61, such as by a speaker (not shown) mounted on or in the all or nearby, propagates directly through the wall studs into block 60 and into the device 20', causing the damping plates comprised in the device to resonate sympathetically in response to the periodic stress transferring into them. During such a continuous energy transfer process, mechanical energy is dissipated harmlessly in the bending modes of the viscoelastic damping plates as heat, thereby making this energy unavailable in the wall studs 61 to produce wall vibrations. The device may be installed between adjacent studs 61 along a wall prior to applying gypsum drywall or other wallboard onto the wall. In walls where a built-in type loudspeaker is to be installed between adjacent wall studs 61, it has been found advantageous to secure two of the devices 20 or 20' (or two of the devices 1 of FIG. 1) between the adjacent studs, one above the top of the built-in loudspeaker and the other below the bottom of the loudspeaker. A major portion of the periodic stress produced in the loudspeaker will therefore be recovered in the two attenuating devices rather than in the wall studs 61. Wall vibrations and their destructive acoustical effect upon listeners are thereby attenuated.

Figure 18:
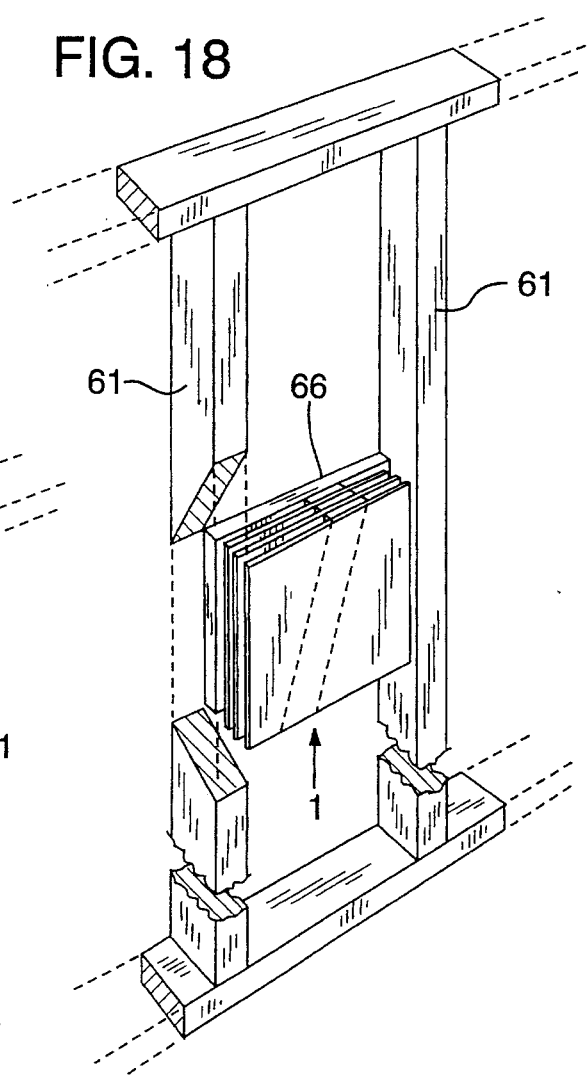
FIG. 18 is a perspective view showing a wall section into which the embodiment of FIG. 1 has been installed.

FIG. 18 is a perspective view of a wall section like that of FIG. 17, with the exception that the vibration attenuating device corresponds to the embodiment of FIG. 1 of the present invention. In FIG. 18, therefore, a medium density fiberboard 66 preferably measuring about one inch in thickness and large enough in cross-sectional area to receive the device 1 is secured tightly between the two adjacent wall studs 61. The device 1 is secured to the fiberboard 66 using a suitable high-density glue. Periodic stress transmitted into wall studs 61 propagates directly through the wall studs into the fiberboard 66, causing the damping plates comprised in the device 1 to resonate sympathetically in response to the periodic stress transferring into them. As explained above, mechanical energy is dissipated harmlessly in the bending modes of the damping plates as heat, thereby making this energy unavailable in the wall studs 61 to produce wall vibrations. As in FIG. 17, the device 1 may be installed between adjacent studs 61 along a wall prior to applying gypsum drywall or other wallboard onto the wall. Two of the attenuating devices may be secured above and below a built-in loudspeaker between adjacent studs. A major portion of the periodic stress produced in the loudspeaker will therefore be recovered in the damping plates of the device i rather than in the wall studs 61, attenuating wall vibrations and their destructive acoustical effect on listeners.

Figure 19:
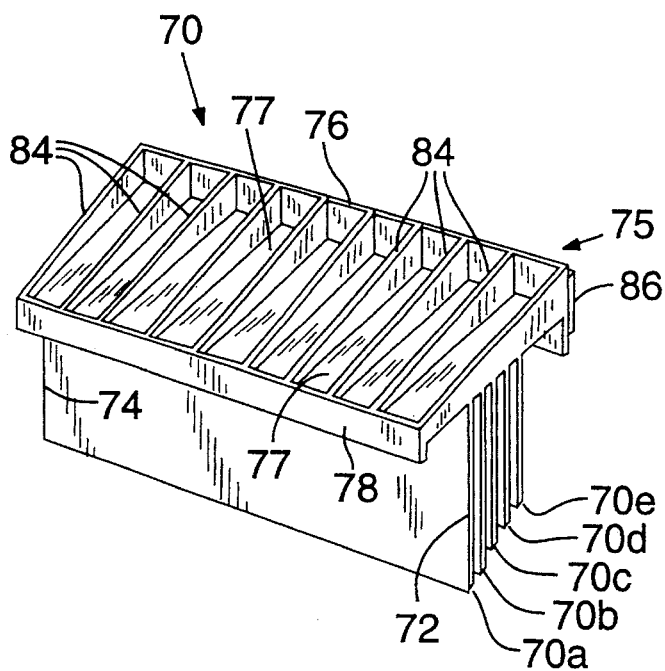
FIG. 19 is a perspective view showing another embodiment of the present invention in which the vibration structure is monolithic, integrally molded.

FIG. 19 shows another embodiment 70 of the present invention. This structure is monolithic, preferably integrally molded, and is composed entirely of a viscoelastic material. In this preferred embodiment, a damping plate 70a measures about 4 inches in length at one end 72 and about 3¾ inches at its opposite end 74, i.e. a trapezoid shape. A damping plate 70b may measure about 3¾ inches at one end 74 and about 3½ inches at its opposite end 72 (see also FIGS. 20 and 21). Damping plate 70c may measure about 3½ inches at one end 72 and about 3¼ inches at its opposite end 74. Damping plate 70d may measure about 3¼ inches at one end 74 and about 3 inches at its opposite end 72. Damping plate 70e may measure about 3 inches at one end 72 and about 2¾ inches at its opposite end 74. These serially decreasing trapezoidal measurements may be better seen in FIG. 21, showing the device 70 in perspective, mounted in a speaker enclosure. The width of the structure, generally left to right in FIG. 19, is preferably about seven inches, and this may also be the width of the five damping plates 70a, 70b, 70c, 70d and 70e. The depth of the structure is selected so that it will fit between the opposed gypsum wallboards of a standard nominal 2"×4" wall (as in FIG. 20). The structure 70 of FIG. 19 is particularly beneficial for reducing vibrations in walls that employ "built-in" loudspeakers. Such built-in loudspeakers operate by relying on the available air space located within the wall and whose boundaries are formed by adjacent wall studs and wallboard.

The preferably integrally formed vibration attenuating device 70 of FIG. 19 has a mounting plate structure generally identified as 75. The mounting plate structure 75 includes a mounting strip 76 having a width sufficient to be attached to a vibrating body, and a securing plate 77 generally perpendicular to the mounting strip 76. A connecting strip 78 extends generally parallel to the mounting strip 76, at the opposite end of the securing plate 77 as shown. A plurality of generally parallel ribs 84 extend between the mounting strip 76 and the connecting strip 78, and in a preferred form of this embodiment, the ribs are triangular or trapezoidal in shape, tapering from a maximum width or height at the mounting strip 76 to a minimum width or height at the connecting strip 78, all as illustrated in FIG. 19. Even though these ribs are integral with the securing plate 77 at their bottom or back edges, and are integral with the strips 76 and 78 at their ends, they have been found to add further to the attenuation of vibrations transmitted into the device 70 from a vibrating body.

The attenuating device 70 may be formed from any of the several different materials listed above, but in a preferred embodiment this form of the invention is integrally molded from high-impact polystyrene.

Figure 20:
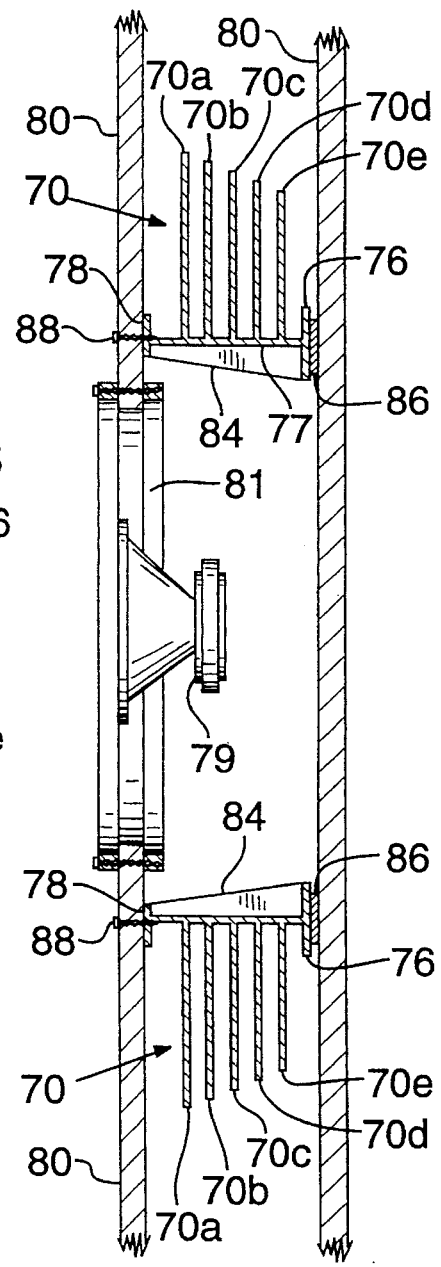
FIG. 20 is a sectional side view of a wall showing an opening into which a built-in loudspeaker driver is installed, showing the vibration absorbing device according to FIG. 19 installed above the speaker in the wall section and also below the speaker in the wall section.
Figure 21:
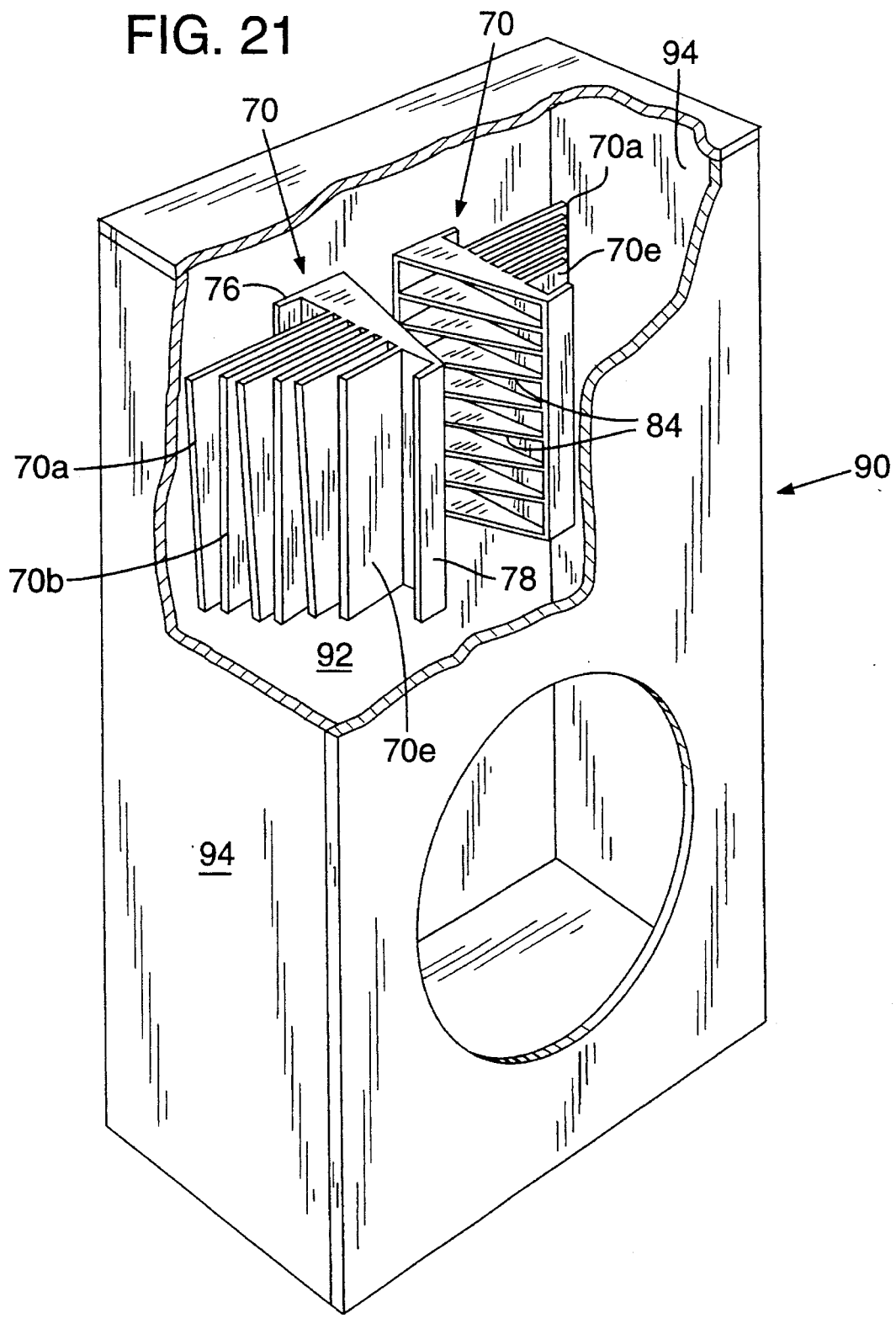
FIG. 21 is a perspective view, partially cut away, showing a speaker enclosure (without speaker driver), with two vibration damping devices of the type shown in FIGS. 19 and 20 mounted on the inside back panel of the enclosure.

FIG. 20 shows the structure 70 of FIG. 19 mounted between the gypsum wallboard of a typical wall section, with a loudspeaker driver 79 mounted on the front panel of wallboard via appropriate mounting structure 81 which may be screwed together through the wallboard 80 as shown. The connecting strip 78 contacts the gypsum wallboard 80 tightly, thereby causing mechanical energy originating in the loudspeaker to transfer from the wallboard, onto which the loudspeaker is mounted, into the damping plates of the vibration absorbing device 70. The damping plates of the device are therefore excited into sympathetic resonance, causing mechanical energy to be dissipated in the bending modes of the viscoelastic damping plates as heat, the energy thus being unavailable in the wallboard to produce wall vibrations and the destructive sounds that such vibrations produce. The ribs 84 molded into the monolithic structure give added strength to the mounting plate 75 as well as contributing to vibration damping as noted above. It has been found advantageous to mount two of the vibration absorbing devices 70 into a wall opening into which a loudspeaker is to be installed, as shown in FIG. 20, one above the speaker opening and one below, prior to installing the loudspeaker. It will be recognized by those skilled in the art that the attenuating device 70 may be constructed in various sizes to accommodate various wall thicknesses and also that the shape and sizes of the damping plates, the material of which they are made, and the number of plates comprised in the device are contributing factors that define the wavelength band or bands of vibrations to which the vibration absorbing device 70 is tuned. All of these may be varied to accommodate different amplitudes and frequency bands of vibration, and also to accomodate the particular space requirements of an application. The device 70 in one preferred configuration is about 3¼ inches to slightly under 3½ inches in the dimension between the outside surfaces of the strips 76 and 78, so as to fit with a clearance between wallborad panels 80 of a standard 2×4 studwall. The strip 76 preferably should not contact the back wallboard 80 directly, to avoid transferring vibration energy into this back wall panel. A spacer strip of rubbery material 86, preferably with adhesive on both sides, i.e. strips of double-stick tape with rubbery thickness, is on the back of the strip 76 to isolate the back wall panel 80 from vibration while at the same time filling the clearance and bracing and holding the device 70 in place in the wall. The device 70 is thus held tightly between wall panels. Self-tapping screws 88 may be used at the accessible front side of the speaker opening, through the drywall 80 and penetrating the plastic connecting strip 78 as shown schematically in FIG. 20, to firmly hold the device 70 to the wall and to facilitate transfer of vibrations from the wall into the device. For wider structural spaces, in older buildings with wider wall studs, a thicker spacer strip 86 (not shown) can be included for sandwiching between the mounting strip 76 and the wallboard. Again, this spacer strip advantageously includes adhesive on both sides.

The vane-like ribs seem to attenuate best at the higher end of the spectrum, approximately 800 to 1000 Hz. The ribs are more tightly suspended than the damping plates 70a, 70b, etc., being secured at both ends and at one side, and thus are mounted in such a way as to allow lower compliance.

It has been found relative to the damping plates of all of the above embodiments that, even though a series of plates preferably are provided, each handling a different band of frequencies, a single plate seems to handle a range of different frequencies to some extent, from perhaps 120 Hz up to about 240 Hz or 480 Hz or even up around 960 Hz. Such attenuation is not as efficient or as complete as in the preferred embodiments described above, but the phenomenon of a single plate handling a fairly wide band is believed to relate to inertia or mass of the plate. If, for example, a damping plate is designed to attenuate vibrations in a band around 240 Hz, and the plate has a mass which is designed for such a band, inertia may hold certain sections of the plate relatively isolated as compared to other sections which then vibrate at higher frequency ranges. Thus, when higher frequency vibrations enter the plate, such as, for example, in a band around 480 Hz or 960 Hz, inertia may cause certain sections to isolate themselves, leaving smaller sections free to vibrate in such a way as to handle these higher frequencies. A known analogy is found in the speaker cone of a speaker driver, wherein regions near the apex of the cone will start vibrating, essentially independently of outer portions of the cone, to accommodate higher frequencies.

Figure 22:
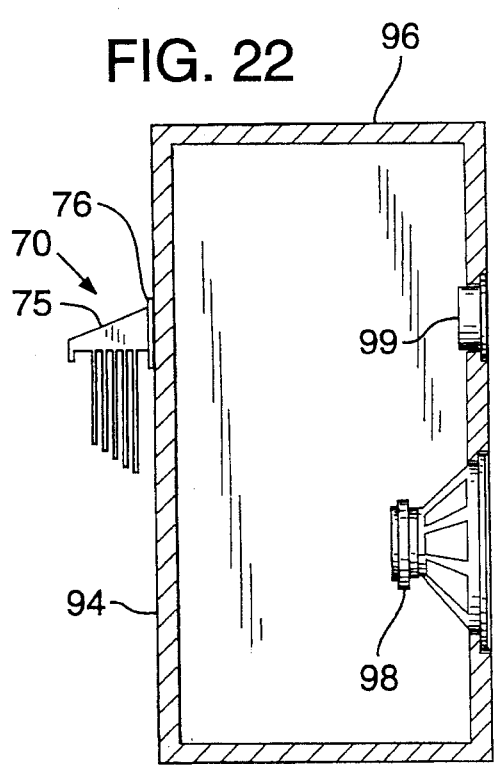
FIGS. 22 and 23 are side views in sectional elevation showing the vibration damping device of FIGS. 19 and 20 mounted on the outside of the back panel of the enclosure and mounted on the inside of the same panel, respectively.
Figure 23:
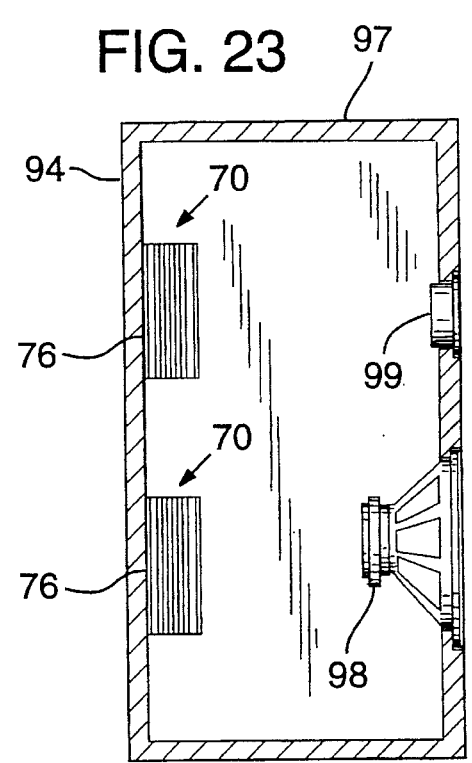

FIGS. 21, 22 and 23 show various ways in which a vibration attenuating device 70 such as that shown in FIGS. 19 and 20 can be incorporated in or on a speaker enclosure. Thus, FIG. 21 shows a speaker enclosure 90, with speaker driver not yet installed. The speaker enclosure 90 is shown broker away to reveal two vibration attenuating devices 80 installed against a back panel 92 of the enclosure. Each vibration attenuator 70 is secured to the panel 92 via its mounting strip 76, which may be secured by direct adhesion, double stick tape (without rubbery material), or appropriate fasteners to the panel. The front strip 78 does not contact the speaker enclosure. FIG. 21 shows the trapezoidal shape of the damping plates 70a, 70b, etc., as described above. The vane-like ribs 84 are also seen in the drawing.

It should be understood that the vibration attenuating devices 70 shown in FIG. 21 can be of the same dimensions as the attenuator shown in FIGS. 19–20 or it can be of different dimensions if desired, so long as appropriate frequency bands are addressed by the size, mass, material and compliance factors of the various damping plates. Also, it should be understood that the attenuating devices 70 can be mounted on one or both side panels 94 of the speaker enclosure, or on the back panel 92 and one or more side panels. Nearly all of the unwanted vibration can be attenuated to the desired extent by the placement of one or more attenuating devices on the back panel alone, although some improvement can be achieved by using a plurality of attenuators located on a plurality of panels.

FIGS. 22 and 23 again show use of vibration damping devices 70 of the type shown in FIGS. 19 and 20 in speaker enclosures 96 and 97. Speaker drivers are shown at 98 and 99 in both views. It can be seen from these sectional views that the vibration attenuator 70 can be located on the back panel outside the speaker enclosure 96, again mounted via the mounting strip 76. Alternatively, the attenuator 70 can be located inside the speaker enclosure 97 as shown in FIG. 23, mounted arranged in a somewhat different way from what is shown in FIG. 21. Again, the devices 70 preferably are secured to the back panel 94 of the speaker cabinet via the mounting strip 76 which forms a base portion of the mounting plate 75 of the device (see also FIG. 19). This can be accomplished with self-tapping screws, direct adhesion, double stick direct mounting tape or other direct mounting means. Mating magnets, as outlined above, may be used if desired, one on the speaker panel and one on the mounting strip 76 of the device. This type of connection allows a user the flexibility to move the device 70 to different locations when desired.

Figure 24:
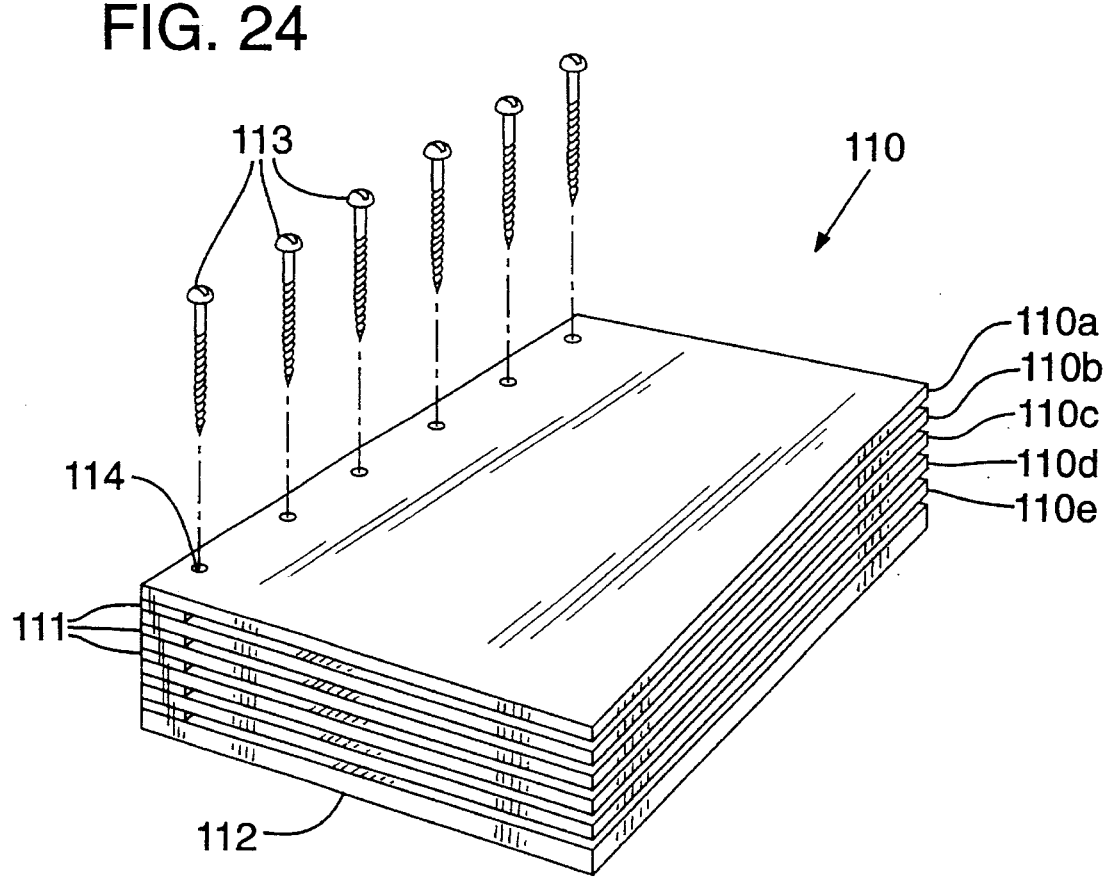
FIG. 24 is a perspective view of a further embodiment.

FIG. 24 is a perspective view of a different embodiment of the invention 110, wherein damping plates are held by one edge in a like manner to that of the embodiment of FIG. 11 but differs from the embodiment of FIG. 11 in that the plates 110a, 110b, 110c, 110d and 110e are held by one edge with essentially equal cantilevered lengths, all such plates preferably being of equal size in the cantilever arrangement shown. In this structure 110, all plates, being essentially equal in their cantilevered lengths, provide the structure of FIG. 24 with the maximum plate area allowed within the constraints imposed by a given space consideration. The embodiment of FIG. 24 is intended for use inside loudspeaker enclosures (e.g. the speaker enclosure 97 in FIG. 23) by attaching the structure 110 to the inside walls of the enclosure where available space is limited due to other devices which take up space such as loudspeaker drivers, wire, crossover networks and insulation material. (This embodiment can also be used in a stud wall such as shown in FIG. 20, in lieu of the embodiment 70 as shown.) For this reason, the spacers 111 between plates are preferably about ⅛" thick and the plates 110a, 110b, 110c, 110d and 110e in a preferred embodiment are about ⅛" thick. A mounting plate 112 is therefore also preferably made as thin as possible but made of a material such as medium density fiberboard or other high-density material which enables the mounting plate to transmit mechanical energy into the damping plates and thus cause the plates to resonate. In the embodiment of FIG. 24, the mounting plate 112 is preferably about ⅜" thick. The cantilevered lengths of the damping plates of this embodiment are about 4¼" and the spacers 111 are about ¾" in length, with width extending fully along the plates. Various widths can be used; an example of two preferred widths are about 3½" and 7". The cantilevered length of the plates, being 4¼", causes the plates to have a natural resonance frequency of approximately 25 Hz. At higher frequencies, the plates respond to mechanical energy being transmitted to them from the loudspeaker enclosure panel to which the damping structure is attached by resonating and therefore dissipating this energy due to the varying resonance modes which the plates 110a, 110b, 110c, 110d and 110e exhibit due to the varying mass and compliance values which vary continuously over the plate surfaces. In this embodiment holes 114 to receive screws 113 are provided near the edge of all plates and in all spacers 111 as shown, including through the mounting plate 112. It should be noted that five damping plates are used in this preferred embodiment; however, different numbers of plates may be included in the structure which will be acceptable within the constraints that may be imposed by space considerations.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In combination, a speaker driver, a speaker enclosure and a vibration attenuating device for attenuating vibrations through a broad range of frequencies of vibration occurring in the speaker enclosure as induced by the speaker driver, comprising:

a mounting plate connecting the vibration attenuating device to the speaker enclosure, a plurality of vibration damping plates connected to the mounting plate, arranged in generally stacked, spaced apart formation, with plate securing means for securing the vibration damping plates so as to suspend portions of the vibration damping plates freely in space, the plate securing means comprising edge securing means for suspending at least some of the damping plates from one edge of the plate, leaving opposite edges of the vibration damping plates freely suspended, and the vibration damping plates being formed of a viscoelastic material capable of dissipating vibrational energy transmitted to the vibration damping plates from the speaker enclosure.

2. The apparatus of claim 1, wherein at least two vibration damping plates are included.

3. The apparatus of claim 1, wherein at least three vibration damping plates are included.

4. The apparatus of claim 1, wherein five vibration damping plates are included.

5. The apparatus of claim 1, wherein the vibration damping plates are cantilevered from the plate securing means, and wherein all of the vibration damping plates are of approximately equal size and arranged in parallel, spaced relation.

6. The apparatus of claim 5, wherein the vibration damping plates each have a cantilevered length of about 4¼ inch.

7. The apparatus of claim 1, wherein the plate securing means includes spacers between damping plates, the spacers being about ⅛" in thickness.

8. The apparatus of claim 5, wherein each vibration damping plate has a thickness of ⅛".

9. The apparatus of claim 5, wherein the speaker enclosure comprises a stud wall within which the speaker driver is located and secured.

10. The apparatus of claim 9, wherein the stud wall includes a drywall layer fastened over vertical wall studs, and wherein the speaker driver is secured to the drywall layer and the vibration attenuating device is separately secured to the drywall layer.

11. The apparatus of claim 5, wherein the speaker enclosure comprises a cabinet, the mounting plate being affixed directly to the cabinet.

12. The apparatus of claim 11, wherein the cabinet has a back panel and wherein the vibration attenuating device is secured to the back panel of the cabinet.

13. The apparatus of claim 12, wherein the vibration attenuating device is secured on an inside surface of the back panel of the cabinet.

* * * * *